(12) United States Patent
Do et al.

(10) Patent No.: US 10,204,494 B2
(45) Date of Patent: Feb. 12, 2019

(54) HAPTIC INFORMATION PROVISION DEVICE

(71) Applicant: CK MATERIALS LAB CO., LTD., Seoul (KR)

(72) Inventors: Seoung Hun Do, Seoul (KR); Hyeong Jun Kim, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

(21) Appl. No.: 15/543,330

(22) PCT Filed: Nov. 24, 2015

(86) PCT No.: PCT/KR2015/012680
§ 371 (c)(1),
(2) Date: Jul. 13, 2017

(87) PCT Pub. No.: WO2016/114487
PCT Pub. Date: Jul. 21, 2016

(65) Prior Publication Data
US 2017/0372565 A1     Dec. 28, 2017

(30) Foreign Application Priority Data

Jan. 13, 2015  (KR) .................. 10-2015-0006450
May 18, 2015  (KR) .................. 10-2015-0068717
May 22, 2015  (KR) .................. 10-2015-0071970

(51) Int. Cl.
*A44C 5/00*         (2006.01)
*G06F 1/16*         (2006.01)
(Continued)

(52) U.S. Cl.
CPC .............. *G08B 6/00* (2013.01); *A44C 5/0015* (2013.01); *G01C 21/265* (2013.01);
(Continued)

(58) Field of Classification Search
None
See application file for complete search history.

(56) References Cited

U.S. PATENT DOCUMENTS 4,456,387 A * 6/1984 Igarashi ................. G04C 21/02
368/230
5,263,317 A * 11/1993 Watanabe ................ B03C 3/70
55/DIG. 30
(Continued)

FOREIGN PATENT DOCUMENTS

JP      2001-191028       7/2001
KR   10-2007-0041224 A    4/2007
(Continued)

*Primary Examiner* — Fekadeselassie Girma
(74) *Attorney, Agent, or Firm* — Stuart H. Mayer; Mayer & Williams PC

(57) ABSTRACT

The present invention relates to a haptic information provision device. The haptic information provision device (100) according to the present invention comprises: a receiver (120) for receiving external notification information; a controller (130) for converting the notification information to a haptic signal; and an operation unit (110) for transferring haptic information to a user according to the haptic signal, wherein the operation unit (110) includes a plurality of operation units (110*a*-110*j*), the respective operation units (110*a*-110*j*) operating in response to different notification information and thus transferring different haptic information to the user.

19 Claims, 15 Drawing Sheets (a)

(b)

(51) Int. Cl.
*G06F 3/01* (2006.01)
*G08B 6/00* (2006.01)
*G01C 21/26* (2006.01)
*G01C 21/36* (2006.01)
*H04M 19/04* (2006.01)

(52) U.S. Cl.
CPC ..... *G01C 21/3652* (2013.01); *G01C 21/3661* (2013.01); *G06F 1/16* (2013.01); *G06F 1/163* (2013.01); *G06F 3/01* (2013.01); *G06F 3/016* (2013.01); *H04M 19/04* (2013.01)

(56) References Cited

U.S. PATENT DOCUMENTS

| | | | | |
|---|---|---|---|---|
| 5,694,920 | A * | 12/1997 | Abrams | A61M 15/0028 128/200.16 |
| 5,949,313 | A * | 9/1999 | Aoki | H01H 50/305 335/133 |
| 9,579,060 | B1 * | 2/2017 | Lisy | A61B 5/6803 |
| 9,651,777 | B2 * | 5/2017 | Horibe | H03B 5/24 |
| 9,811,818 | B1 * | 11/2017 | Xing | A61B 10/0051 |
| 2005/0052852 | A1 * | 3/2005 | Ono | G06F 1/163 361/749 |
| 2005/0145472 | A1 * | 7/2005 | Beckwith | G08G 1/005 200/521 |
| 2005/0254971 | A1 * | 11/2005 | Ohya | F04B 45/043 417/413.1 |
| 2007/0001662 | A1 * | 1/2007 | Suzuki | G01C 19/56 324/117 R |
| 2007/0012107 | A1 * | 1/2007 | Suzuki | G01C 19/56 73/504.12 |
| 2007/0244641 | A1 * | 10/2007 | Altan | B60Q 9/008 701/300 |
| 2009/0171313 | A1 * | 7/2009 | Yamamoto | A61N 1/044 604/501 |
| 2011/0035100 | A1 * | 2/2011 | Sanma | B60K 35/00 701/36 |
| 2011/0224523 | A1 * | 9/2011 | Budiman | A61B 5/14532 600/365 |
| 2012/0139722 | A1 * | 6/2012 | Wong | A61B 5/0002 340/539.12 |
| 2013/0218456 | A1 * | 8/2013 | Zelek | G01C 21/3652 701/412 |
| 2013/0309061 | A1 * | 11/2013 | Chang | F04D 15/00 415/1 |
| 2014/0180582 | A1 * | 6/2014 | Pontarelli | G01C 21/20 701/494 |
| 2014/0313128 | A1 * | 10/2014 | Golko | G06F 1/163 345/156 |
| 2014/0340720 | A1 * | 11/2014 | Horibe | H03B 5/24 358/474 |
| 2015/0097449 | A1 * | 4/2015 | Suzuki | G02B 26/10 310/37 |
| 2015/0319521 | A1 * | 11/2015 | Yuen | H04R 1/1058 381/380 |
| 2015/0366518 | A1 * | 12/2015 | Sampson | A61B 5/7221 600/301 |
| 2016/0367138 | A1 * | 12/2016 | Kim | A61B 5/6803 |
| 2017/0007919 | A1 * | 1/2017 | Cohen | A63F 13/21 |
| 2017/0034612 | A1 * | 2/2017 | Timothy | H04R 1/10 |
| 2017/0040864 | A1 * | 2/2017 | Takabe | F04B 35/04 |
| 2017/0207677 | A1 * | 7/2017 | Takabe | H02K 7/14 |

FOREIGN PATENT DOCUMENTS

| | | |
|---|---|---|
| KR | 10-0960970 B1 | 6/2010 |
| KR | 10-2012-0019548 A | 3/2012 |
| KR | 10-2015-0026387 | 2/2015 |
| KR | 10-2015-0036809 | 3/2015 |
| WO | 2011/055326 A1 | 5/2011 |

\* cited by examiner (a)

(b)

(a)

(b)

(a)

(b)

(a)

(b)

(a)

(b)

HAPTIC INFORMATION PROVISION DEVICE

TECHNICAL FIELD

The present invention relates to a tactile information supply device. More particularly, the present invention relates to a tactile information supply device capable of converting the information received from outside into tactile signals and providing route guidance and a notification.

BACKGROUND ART

In recent years, electronic devices have evolved in a direction toward smaller, slimmer, and easier-to-carry ones while performing the same or more various functions. These small electronic devices are usually stored and carried in the user's pocket or the like, but they are worn on the wrist or worn on the head portion or arm of the human body.

A wearable device for a human body or various structures generally includes a body for performing functions inherent to an electronic device, and a strap for being drawn out in a predetermined length from the body and fixed to a human body or a structure. These wearable devices may be used independently or may be used depending on other electronic devices. When used depending on an electronic device, a communication method using a short-range communication module can be adopted, and the use of the wearable electronic device can save the cumbersome and frequent use of other electronic devices. Therefore, the use of such wearable electronic devices is becoming increasingly widespread.

Meanwhile, a navigation system is a device that provides directional guidance by displaying information on the current location and information toward the destination (for example, a straight line distance, a direction, etc.) using information received from a satellite or a base station. A navigation device for a vehicle generally includes an manipulation section for inputting instructions to the navigation system, a GPS receiver for detecting the position, a position detection section including a plurality of sensor devices such as a movement sensor and a gyro sensor, a control section for analyzing the geographical information from the current location to the destination in response to the instructions that are input through the manipulation section, and a display section for displaying information related to the route guidance.

Conventional navigation devices or apps providing route guidance as described above provide the information depending only on visual and auditory sense. Therefore, it is problematic that it is difficult to efficiently provide information while the user is in a conversation or have difficulty in turning his/her gaze. Furthermore, it is problematic that the risk of an accident increases when a user turns his or her gaze to view the route guidance displayed on the navigation device during driving.

Meanwhile, when using a mobile terminal such as a smartphone or a smart watch, the user generally obtains most of the information through the display of the terminal. Therefore, it is problematic that it is not easy for the user to view the screen of the display in situations such as when the user is exercising, moving, or in a crowded public transportation vehicle.

Therefore, there is a need for a wearable electronic device and tactile information supply device capable of effectively transmitting external notification information such as route guidance, texts, and alarms.

Meanwhile, the background art of the present invention is disclosed in Korean Laid-Open Patent Application Nos. 10-2015-0026387 (Mar. 11, 2015) and 10-2015-0036809 (Apr. 7, 2015).

DETAILED DESCRIPTION OF THE INVENTION

Technical Problem

Accordingly, the present invention has been made to solve the above problems of the prior art, and an object of the present invention is to provide a tactile information supply device capable of more effectively transmitting information such as route guidance and text alarm.

Another object of the present invention is to provide a tactile information supply device capable of effectively receiving tactile information even when the user has difficulty in receiving information in the form of visual and auditory information.

Still another object of the present invention is to provide a tactile information supply device that is worn on a part of the user's body and transmits various tactile information such as vibration, brushing, constriction, beating, pressing, tapping and tilting to the user.

Yet another object of the present invention is to provide a tactile information supply device capable of performing navigation operation by providing directional information such as the remaining distance to the destination, the point of turning directions, the location of parked vehicles or the route guidance toward exterior or interior stores through tactile sensations to the user, even when the user is in conversation or has difficulty in turning his/her gaze.

Technical Solution

The above object of the present invention can be achieved by a tactile information supply device comprising: a receiving apparatus comprising: a receiver for receiving external message information; a controller for converting the message information into a tactile signal; and an operator for providing a user with tactile information according to the tactile signal, wherein the operator includes a plurality of operation units and each of the operation units operates in response to different notification information to provide different tactile information to the user.

Advantageous Effects

According to the present invention configured as described above, it is possible to more effectively transmit information such as route guidance and text alarm.

Furthermore, according to the present invention, it is possible to effectively receive tactile information even when the user has difficulty in receiving information in the form of visual and auditory information.

Furthermore, according to the present invention, it is possible to transmit various tactile information such as vibration, brushing, constriction, beating, pressing, tapping and tilting to the user.

Furthermore, according to the present invention, it is possible to perform navigation operation by providing directional information such as the remaining distance to the destination, the point of turning directions, the location of parked vehicles or the route guidance toward exterior or interior stores through tactile sensations to the user, even when the user is in conversation or has difficulty in turning his/her gaze.

EXPLANATION OF REFERENCE NUMERALS

Figure 1:
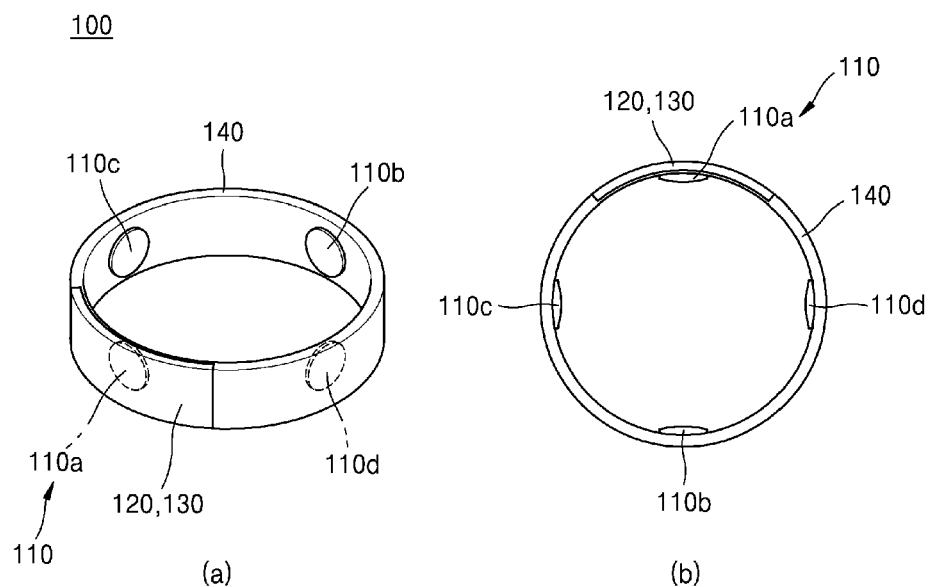
FIG. 1 shows a perspective view and a side elevation view of a tactile information supply device according to a first embodiment of the present invention.

100, 100', 100": tactile information supply device
110: operator
110a-110o: operation unit
111, 112: tactile sensation provider
113: tactile sensation provider housing
115: magnetic field generator
120, 160: receiver
130: controller
140: band, band portion
150: terminal coupling portion
170: core coupling portion
180: coupling portion
200: terminal
210: notification information transmitter
300: smart core

MODE OF THE INVENTION

The accompanying drawings, which show embodiments for illustrative purposes only, will be referred to. The embodiments will be described in sufficient detail for one of ordinary skill in the art to understand the present invention. It should be understood that various embodiments of the present invention may differ from each other but need not be mutually exclusive. For example, particular shapes, structures and characteristics disclosed herein may be embodied in other embodiments without departing from the spirit and scope of the present invention. Furthermore, the position or arrangement of individual elements in each embodiment disclosed herein may change without departing from the spirit and scope of the present invention. Accordingly, the following detailed description is not intended to be restrictive, and the scope of the present invention is determined only by the accompanying claims along with equivalents of what is claimed by the claims, if properly explained. In the drawings, like reference numerals denote like elements and lengths, areas, thicknesses or shapes may be exaggerated for the sake of convenience.

The following description is given of embodiments of the present invention with reference to the attached drawings in such a manner that the present invention can be easily carried out by one of ordinary skill in the art.

Figure 2:
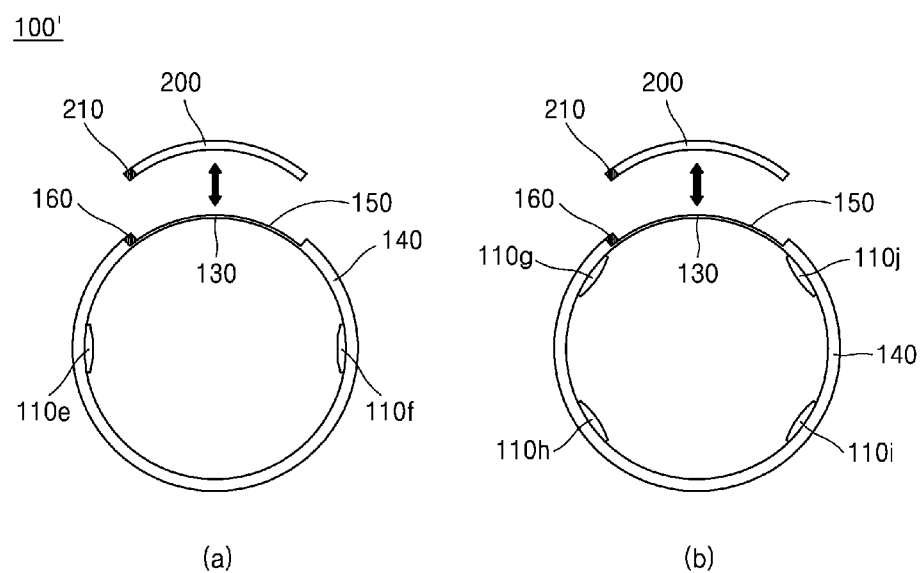
FIG. 2 is a side elevation view of a tactile information supply device according to a second embodiment of the present invention.

FIG. 1 shows a perspective view and a side elevation view of a tactile information supply device 100 according to an embodiment of the present invention, and FIG. 2 shows a side elevation view of a tactile information supply device according to another embodiment of the present invention.

Referring to FIG. 1, the tactile information supply device 100 of the present invention may include an operator 110, a receiver 120, and a controller 130. The tactile information supply device 100 can be used as it is, and can be used by being attached or connected to a conventional device, for example, a mobile communication terminal such as a smartphone, a body portion (or core) of a wearable device such as a smart watch, a vehicle navigation system, or the like (see FIG. 2). Here, it should be understood that the connection includes not only a direct wire connection but also a wireless connection.

The tactile information supply device 100 is worn on a part of the user's body, that is, on the wrist, arm, ankle, neck, etc., and can provide tactile information directly or indirectly to the user. The tactile information supply device 100 may be in the shape that can be worn by the user, such as a watch, a band, or the like.

The operator 110 may provide tactile information to the user according to a tactile signal transmitted from the controller 130. In the present specification, the tactile information is assumed to be a vibration, but the tactile information is not limited to the vibration, but should be understood to include tactile sensations such as brushing, constriction, beating, pressing, tapping, tilting and tickling, and emotions, feelings, etc. transferred via tactile sensations (e.g., transferring the emotion of "love" via a tactile sensation generated by the shape of "♡" or the feeling of "sadness" via a tactile sensation generated by the shape of "T_T").

The operator 110 may be provided on a surface of the tactile information supply device 100 that contacts the user to directly provide tactile information. For example, the operator 110 may be disposed on the inner circumferential surface of the band 140 of the tactile information supply device 100. Meanwhile, the operator 110 may be disposed inside the band 140 to indirectly provide tactile information such as vibration and tapping to the user.

The operator 110 may include a plurality of operation units 110a-110d. In FIG. 1, four operation units 110a-110d are arranged in the upward, the downward, the leftward and the rightward directions, respectively, but the present invention is not limited thereto. Of course, the operator 110 may be provided on the whole or part of the inner circumferential surface of the band. Besides, the shape of the operator 110 is not restricted as long as it is within the object of at least part of the operator 110 contacting a user and providing tactile information for the user.

Each of the operation units 110a-110d operates in response to different notification information to provide different tactile information to the user. This will be described later with reference to FIGS. 17 to 21.

The receiver 120 may receive external notification information, and may use any known data receiving device. The notification information should be understood to include not only information such as simple warnings, alarms, or route/location guidance, which can be transmitted over a wired/wireless communication network but also image information such as texts, geometric figures, or symbols.

The controller 130 may convert the notification information the receiver 120 received, into a tactile signal. The tactile signal is a control signal capable of controlling each component of the operator 110, and should be understood to include a signal for applying/removing a magnetic field to a tactile provider 111, which will be described below, in addition to a signal capable of controlling the operation intensity, operation pulse, etc. of the operation units 110a-110d.

FIG. 2 is a side elevation view of a tactile information supply device 100' according to a second embodiment of the present invention.

Referring to FIG. 2, a conventional terminal 200, in particular, a main body (or core) 200 of a smart watch, can be coupled to the tactile information supply device 100' according to another embodiment of the present invention.

The band 140 may be provided with a terminal coupling portion 150 to which an external terminal 200 can be coupled. The terminal coupling portion 150 may be formed in the shape of a groove such that the terminal 200 may be seated therein. When the terminal 200 is seated in the terminal coupling portion 150, a notification information transmitter 210 of the terminal 200 comes into contact with a receiver 160 of the tactile information supply device 100' such that notification information is received. Various computer software and applications installed in the terminal 200 can generate notification information and transmit the notification information to the receiver 160 through the notification information transmitter 210 such as a USB terminal. The controller 130 may convert the received notification information into a tactile signal and then transmit tactile information to the user.

In FIG. 2, two operation units 110e and 110f are disposed on the left and right sides, respectively ((a) of FIG. 2), or four operation units 110g-110j are spaced apart by predetermined distances along the inner circumferential surface of the band 140 ((b) of FIG. 2), but the present invention is not limited thereto.

Figure 3:
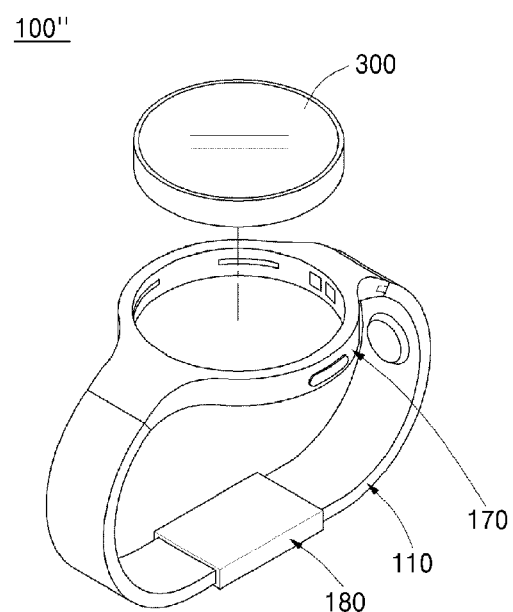
FIG. 3 is a perspective view of a tactile information supply device according to a third embodiment of the present.
Figure 4:
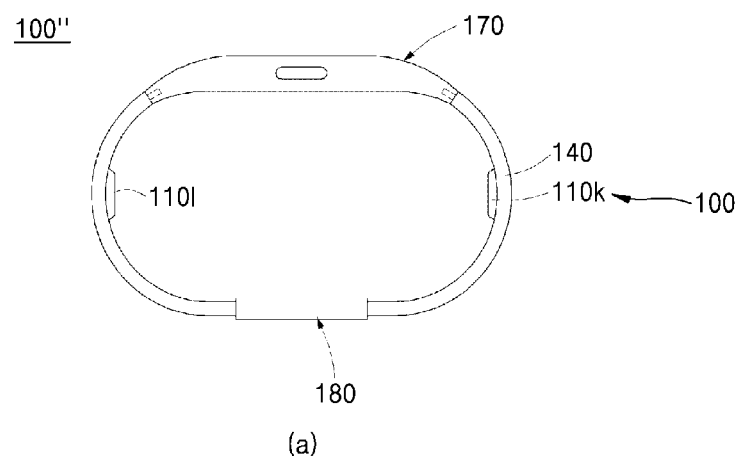
FIG. 4 is a side elevation view of a tactile information supply device according to the third embodiment of the present invention.
Figure 4:
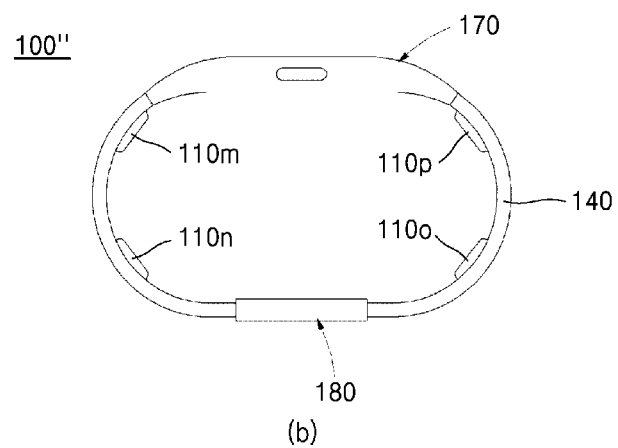

FIG. 3 is a perspective view of a tactile information supply device 110" according to a third embodiment of the present, and FIG. 4 is a side elevation view of a tactile information supply device 110" according to the third embodiment of the present invention.

Referring to FIGS. 3 and 4, the tactile information supply device 100" includes a core coupling portion 170 to which a smart core 300 (or an external terminal) for providing information can be attached or detached, an operator 110 connected to the core coupling portion 170 and providing tactile information to a user, and a coupling portion 180 provided on one side of the operator 110 and configured to be fastened to a part of the body of the user.

The tactile information supply device 100" of the third embodiment is connected to the smart core 300, and can convert signal information or location information provided by the smart core 300 into tactile information, thereby providing directional information to the user through tactile senses.

In an embodiment of the core coupling portion 170, the core coupling portion 170 includes a coupling portion (not shown) electrically coupled to the smart core 300, a communication portion (not shown) for transmitting and receiving the location information of the user, and a controller (not shown) for converting the information provided by the smart core 300 or the communication portion into a tactile signal, and the controller provides the tactile signal to the operator 110.

The core coupling portion 170 and the operator 110 can be coupled to or separated from each other. The core coupling portion 170 converts the information from the smart core 300 into a tactile signal and provides the tactile signal to the operator 110.

For example, the core coupling portion 170 may be electrically connected to the smart core 300 which provides and displays a diversity of information, or may transmit and receive the location information of the user and then convert the information into a tactile signal and provide the tactile signal to the operator 110 at the same time.

Furthermore, even when not coupled to the smart core 300, the core coupling portion 170 may perform a function of providing route guidance using the location information of the user through the communication portion. That is, the core coupling portion 170 can perform various independent functions regardless of the smart core 300.

Particularly, the coupling portion is configured such that the smart core 300 can be attached to and detached from the coupling portion, and can exchange electrical signals or power with the smart core 300. Accordingly, a diversity of information provided by the smart core 300 can be transmitted to the controller through the coupling portion. In addition, through the coupling portion, a tactile signal and power can be transmitted to the terminal coupling portion 100 for information inputted from the smart core 300.

Furthermore, the communication portion can transmit and receive the location information of the user. For example, the communication portion can transmit and receive GPS signals and provide the location information of the user to the controller.

The controller may convert the information that is provided by the coupling portion and the communication portion into a tactile signal, and may provide the converted tactile signal to the operator 110. Here, power can be supplied to the operator 110 at the same time. In addition, the controller may have the same configuration and perform the same function as that of the controller 130 shown in FIGS. 1 and 2.

Next, the operator 110 of the tactile information supply device 100" includes a band portion 140 in close contact with the user's body and a plurality of operation units 110: 110k-100p provided on the inner side of the band portion 210.

The band portion 140 is coupled to both ends of the terminal coupling portion 100, is in the shape that can be attached to the user's body, wrist, ankle, waist or neck, and may be made of a material including rubber or silicone.

A plurality of operation units 110 may be provided on the band portion 140 and electrically connected to the core coupling portion 170, thereby transmitting tactile information to a user according to a tactile signal transmitted by the core coupling portion 170.

Figure 5:
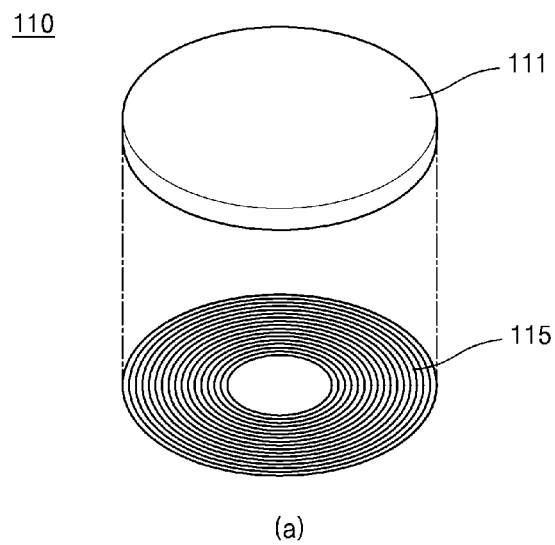
FIG. 5 shows an exploded perspective view and a side cross-sectional view of an operation unit according to an embodiment of the present invention.
Figure 5:
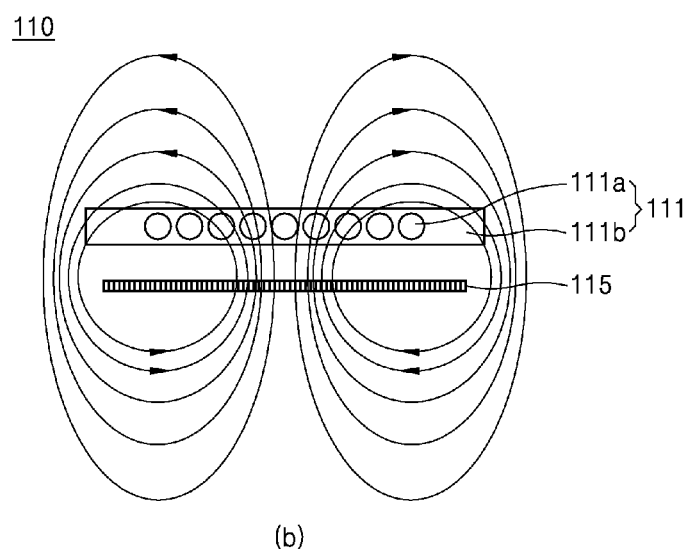

FIG. 5 shows an operation unit (i.e. operator 110) according to an embodiment of the present invention. (a) of FIG. 5 is an exploded perspective view of the operation unit, and (b) of FIG. 5 is a schematic view illustrating the magnetic force lines of a magnetic field generated by the magnetic field generator 115.

Referring to FIG. 5, the operation unit may include a tactile sensation provider 111 and a magnetic field generator 115.

In an embodiment, the tactile sensation provider 111 may include magnetic particles 111a and a matrix material 111b. For example, the magnetic particles 111a may be iron (Fe), cobalt (Co), nickel (Ni), or ferrite particles and, preferably, carbonyl iron particles. The size of the magnetic particles 111a may range from 0.01 um to 100 um. To maximize the transformation of the tactile sensation provider 111 by the magnetic field generator 115, it is preferable that the magnetic particles 111a in the matrix material 111b have a high saturation magnetization, a high content, and a large size. The magnetic particles 111a are not limited to a specific shape but may be in the shape of a sphere, a flake with a high aspect ratio and a magnetic anisotropy, or the like.

The matrix material 111b may include rubber or other polymer material or the like. The matrix material 111b preferably has a high elasticity to maximize the transformation and restoring force of the tactile sensation provider 111. Furthermore, the elongation and tensile strength of the matrix material may be adjusted to enhance the durability.

In another embodiment, the tactile sensation provider 111 may include a magnetorheological elastomer (MRE). The MRE is an elastomer material including particles that are capable of responding to an external magnetic field. Since the elastomer material includes magnetic particles that are capable of being magnetized in response to an external magnetic field, the characteristics of the MRE, e.g., stiffness, tensile strength, and elongation rate, may be changed by the application of the external magnetic field.

In addition, the tactile sensation provider 111 may be in the shape of at least one of an empty cylinder, a fine projection, a polyhedron such as a dome, a plate, a seesaw, and a tunnel. In FIG. 5, it will be assumed that the tactile sensation provider 11 is in the shape of an empty cylinder and a description thereof will be given accordingly.

The magnetic field generator 115 may generate a magnetic field and include at least one coil unit. The magnetic field generator 115 is provided under the tactile sensation provider 111 and generates a magnetic field, to which the magnetic particles 111a in the tactile sensation provider 111 respond. However, the magnetic field generator 115 may be provided at locations other than under the tactile sensation provider 111 as long as it is within a range in which the magnetic field can be applied to the tactile sensation provider 111. At least one of a planar coil and a solenoid coil is used as the magnetic field generator 115, which generates an alternating-current (AC) magnetic field when an alternating current having a size and shape corresponding to the tactile sensation provider 111 is applied and generates a direct-current (DC) magnetic field when a direct current is applied.

Furthermore, the magnetic field generator 115 has a location and shape that corresponds to the tactile sensation provider 111. The shape of the tactile sensation provider 111 may be changed in response to the magnetic field generated by the magnetic field generator 115, and tactile sensations may be transferred through the transformation of the tactile sensation provider 111. Here, the tactile sensation may be at least one of vibration, brushing, constriction, beating, pressing, tapping, and tilting.

Furthermore, the magnetic field generator 115 may change the type of the magnetic field to change the characteristics of the tactile sensation provider 111. For example, the tactile sensation provider 111 vibrates when an AC magnetic field is generated, and the stiffness of the tactile sensation provider 111 changes when a DC magnetic field is generated.

Furthermore, in another embodiment, the operator 110 may be a motor or an actuator for generating vibrations and transmitting tactile information. Particularly, the operator 110 may employ at least one of an inertial actuator including an eccentric motor that vibrates by an eccentric force generated by the rotation of the motor, and a linear resonant actuator (LRA) that maximizes the vibrational intensity by resonant frequencies, a piezoelectric actuator in the shape of a beam or a disk and is driven by a piezoelectric element whose size or shape changes instantaneously in response to an electric field, an electroactive polymer (EAP) actuator generating vibrations by repeated movements of a mass attached to an EAP film, and an electrostatic actuator driven by an attractive force generated between two oppositely charged glass sheets and a repulsive force generated when the glass sheets have charges with the same polarity. Since the above motor or actuator is a known technology, a detailed description thereof will be omitted.

Furthermore, the operator 110 can directly or indirectly transmit tactile information of vibration, brushing, constriction, beating, pressing, tapping, or tilting to the user according to the received tactile signal. Therefore, the operator 110 provides the user with directional information and the user can recognize a diversity of information such as directional information according to the tactile information from the operator 110.

Figure 6:
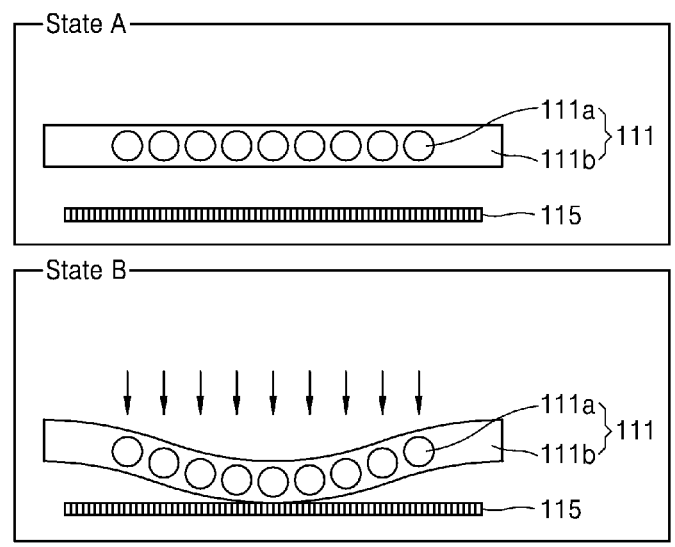
FIGS. 6 and 7 are views illustrating the process in which a tactile sensation provider according to an embodiment of the present invention provides tactile information in response to an external magnetic field.
Figure 7:
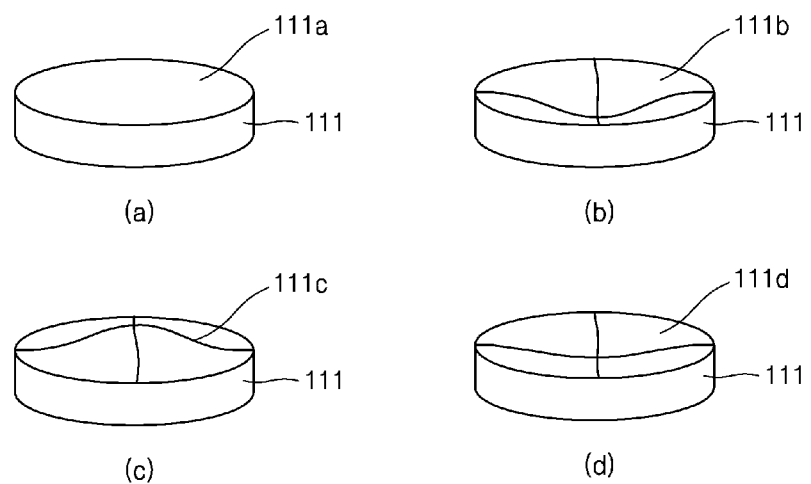

FIGS. 6 and 7 are views illustrating the process in which the tactile sensation provider 111 according to an embodiment of the present invention provides tactile information in response to an external magnetic field.

FIG. 6 specifically shows the shapes of the magnetic particles and the matrix material of the tactile sensation provider 111 depending on whether or not a magnetic field is generated by the magnetic field generator 115. Here, State A is a state in which electric current is not applied to the magnetic field generator 115 (i.e., a state in which no magnetic field is generated), and shows an initial shape (a first shape) of the tactile sensation provider 111. State B is a state in which electric current is applied to the magnetic field generator 115 (i.e., a state in which a magnetic field is generated), and shows a transformed shape (a second shape) in which the tactile sensation provider 1 is bent upward or downward in response to the magnetic field. The transformation from the first shape to the second shape may be repeated to produce a reciprocating motion, thereby transferring vibrational sensations.

Referring to (a) of FIG. 7, when not influenced by an external magnetic field, the tactile sensation provider 111 in the shape of an empty cylinder may have a top surface 111a in a flat shape (or a first shape). Then, referring to (b) of FIG. 7, when influenced by an external magnetic field, the tactile sensation provider 111 may have a shape 111b in which the top surface 111b subsides into the empty internal space (or a second shape). Then, when not affected by the external magnetic field after the application of the magnetic field is ceased, the tactile sensation provider may return from the second shape to the first shape and produce a reciprocating motion 111c and 111d by its own elastic force (or restoring force), as shown in (c) and (d) of FIG. 7. Accordingly, as the first shape or the second shape is repeated according to the application of the magnetic field, i.e. the top surface moves in the reciprocating motion, a tactile sensation similar to or vibration or tapping may be transferred.

Meanwhile, the tactile sensation provider 111 may comprise at least one thin permanent magnet having a shape such as a disk. The permanent magnet does not transmit the tactile information by the deformation from the first shape to the second shape as in the tactile sensation provider 111 shown in FIG. 7, but transmits tactile information through change of position (i.e. vibration) in the upward and downward directions in response to the application of a magnetic field from the magnetic generator 115.

Figure 8:
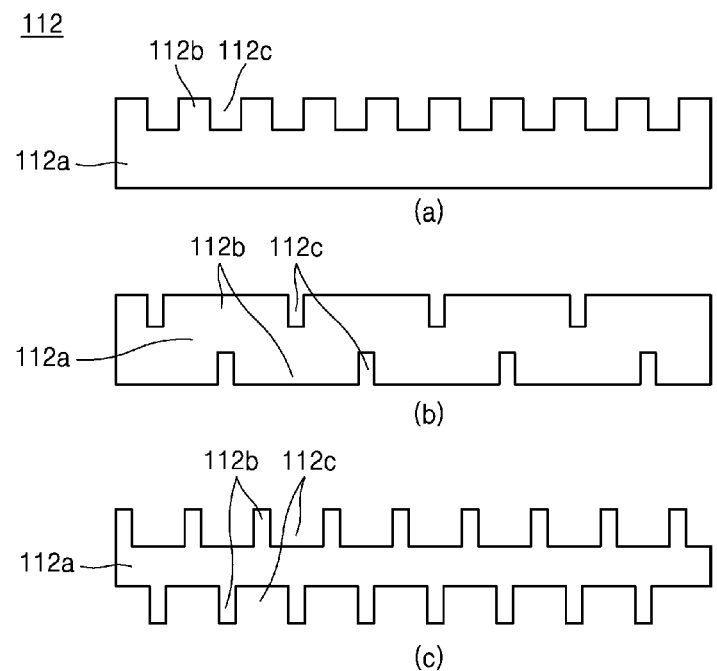
FIG. 8 is a view showing a tactile sensation provider according to another embodiment of the present invention.
Figure 9:
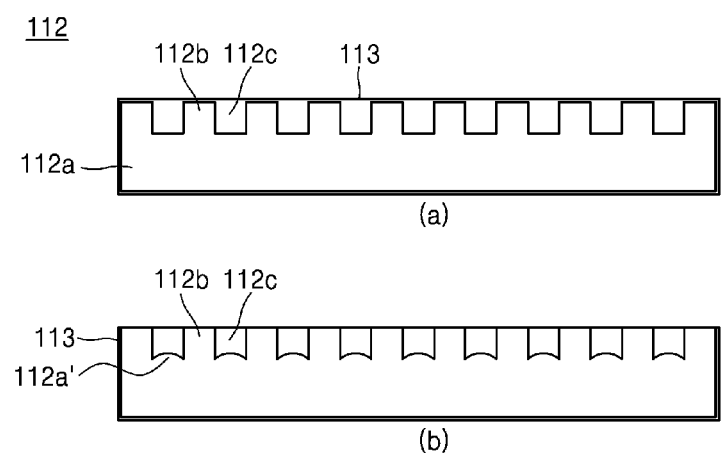
FIG. 9 is a view illustrating the process in which a tactile sensation provider according to another embodiment of the present invention provides tactile information in response to an external magnetic field.

FIG. 8 is a view showing a tactile sensation provider 112 according to another embodiment of the present invention, and FIG. 9 is a view illustrating the process in which a tactile sensation provider 112 according to another embodiment of the present invention provides tactile information in response to an external magnetic field.

Referring to FIG. 8, the tactile sensation provider 112 according to another embodiment of the present invention includes a base portion 112a and a protrusion portion 112b and a recess portion 112c formed alternately on at least one of upper and lower surfaces of the base portion 112a. That is, at least one of the upper surface and the lower surface of the base portion 112a may have a concavo-convex structure. (a) of FIG. 8 shows that protrusion portions 112b and recess portions 112c are formed only on the upper surface of the base portion 112a while (b) and (c) of FIG. 8 show that protrusion portions 112b and recess portions 112c having different sizes are formed on both sides of the base portion 112a.

In FIG. 9, the process of providing tactile information will be described by taking the tactile sensation provider 112 of (a) of FIG. 8 as an example. Referring to (a) of FIG. 9, the tactile sensation provider 112 can be disposed in a tactile sensation provider housing 113 that surrounds the tactile sensation provider 112 such that the tactile sensation provider 112 fits the size of the tactile sensation provider housing 113. However, the tactile sensation provider 112 does not necessarily fit the size of the tactile sensation provider housing 113 as long as it is within the object of efficiently transmitting tactile information.

For example, when not influenced by an external magnetic field, the base portion 112a, the protrusion portion 112b and the recess portion 112c of the tactile sensation provider 112 may maintain a state (or a first shape) of being fixedly supported by the edges of the tactile sensation provider housing 113. Referring to (b) of FIG. 9, when influenced by an external magnetic field, the protrusion portion 112b is fixedly supported by the upper portion of the tactile sensation provider housing 113, but a part of the base portion 112a may change from a shape 112a to a shape 112a' (or a second shape). A part of the base portion 112a' of which the shape is changed can move into a space of the recess portion 112c which is relatively spacious. In other words, the base portion 112a' can utilize the recess portion 112c as a space for up and down movement. Then, when not influenced by the external magnetic field after the application of the magnetic field is ceased, the base portion may vibrate by its own elastic force (or restoring force) while returning from the second shape 112a' to the first shape 112a. That is, tactile information similar to vibrations or tapping may be transferred by repetition of the first shape and the second shape in response to the application of a magnetic field.

As described above, since the recess portion 112c provides the tactile sensation provider 112 with a space for the up and down movement of the base portion 112a, it is not necessary to secure a separate configuration for providing additional space such that the tactile sensation provider 112 moves up and down. This has the advantage of not only lowering the cost of manufacturing the entire product but also contributing to reduction in thickness, miniaturization and slimming of the product.

Figure 10:
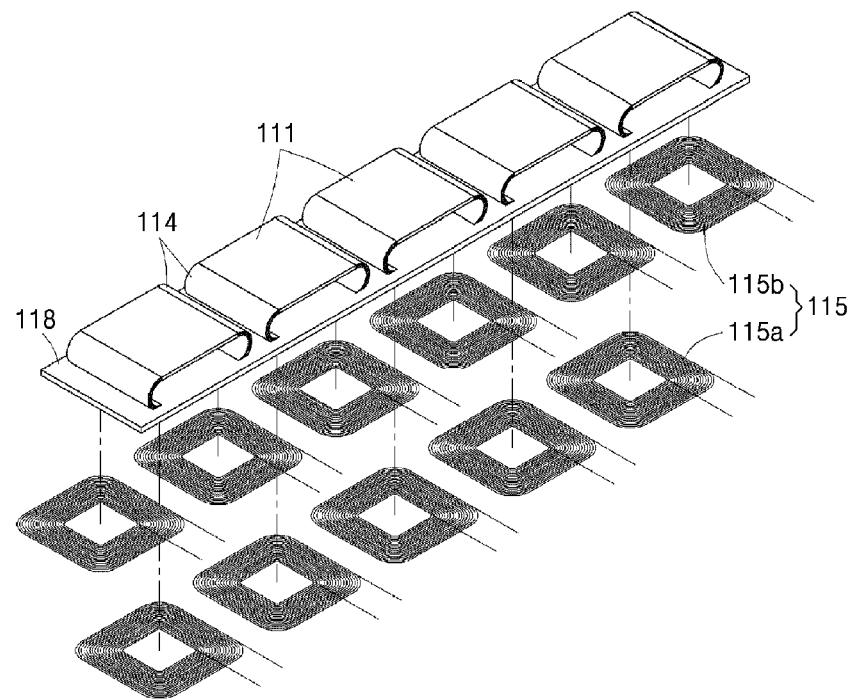
FIG. 10 illustrates a configuration of an operation unit according to the first embodiment of the present invention.
Figure 11:
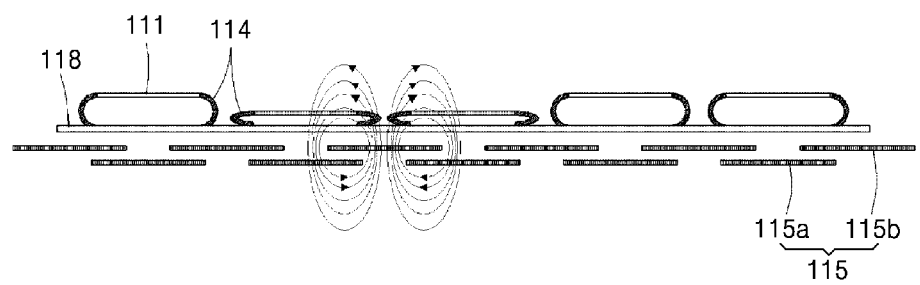
FIG. 11 illustrates the operation of the operation unit according to the first embodiment of the present invention.
Figure 12:
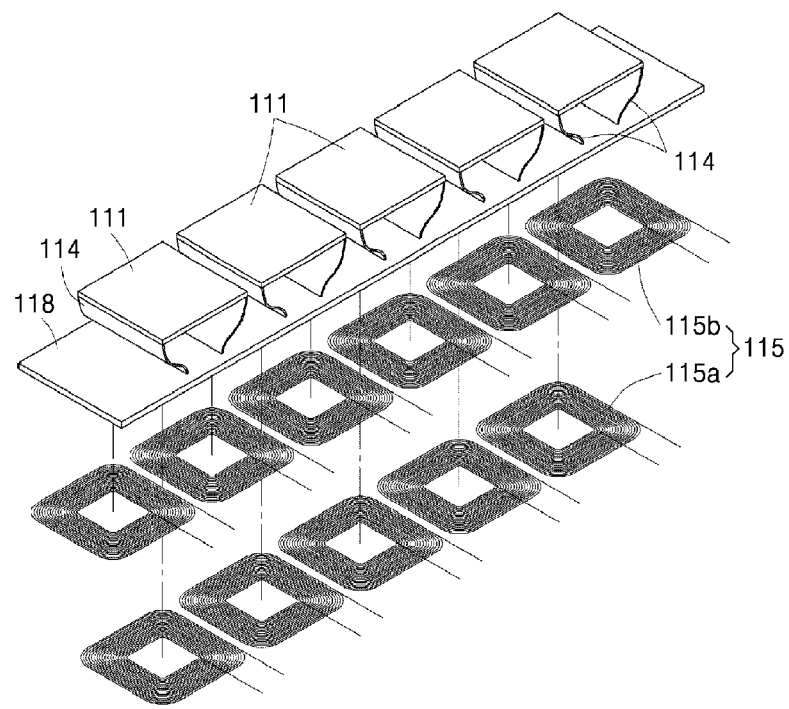
FIG. 12 illustrates a configuration of an operation unit according to the second embodiment of the present invention.
Figure 13:
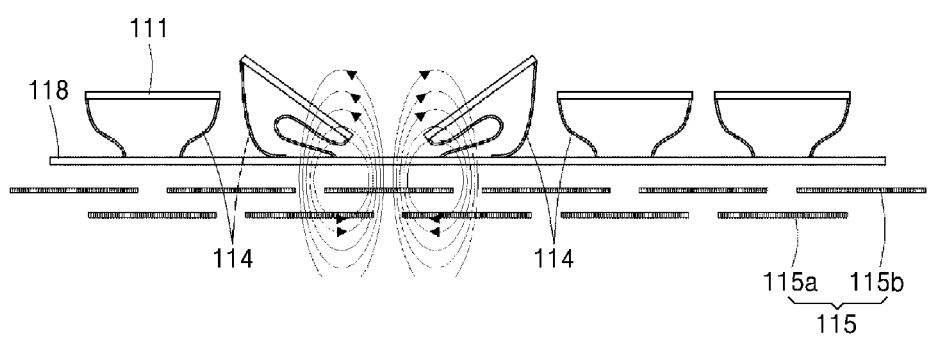
FIG. 13 illustrates the operation of the operation unit according to the second embodiment of the present invention.
Figure 14:
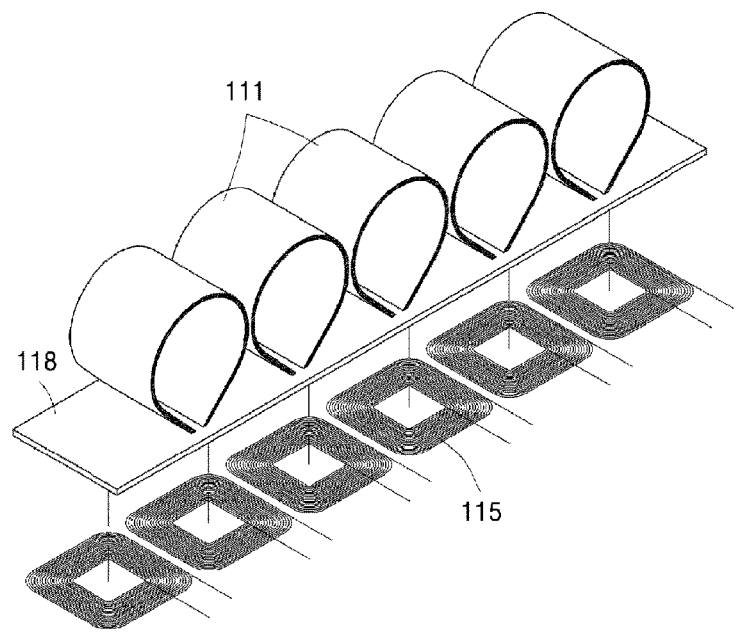
FIG. 14 illustrates a configuration of an operation unit according to the third embodiment of the present invention.
Figure 15:
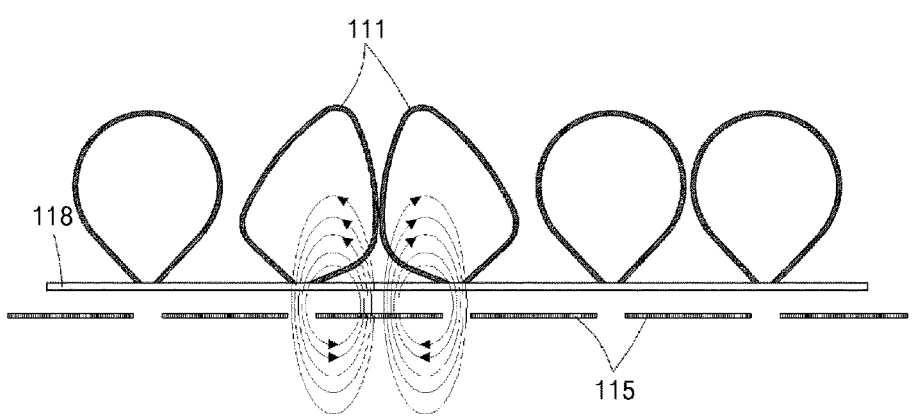
FIG. 15 illustrates the operation of the operation unit according to the third embodiment of the present invention.

FIGS. 10 and 11 illustrate the structure and operation of the operation unit according to the first embodiment of the present invention, FIGS. 12 and 13 illustrate the structure and operation of the operation unit according to the second embodiment of the present invention, and FIGS. 14 and 15 illustrate the structure and operation of the operation unit according to the third embodiment of the present invention.

Referring to FIGS. 10 and 11, in the operator 110 according to the first embodiment, a plurality of tactile sensation providers 111 and supporters 114 may define at least one cell, a plurality of cells may be disposed on an insulator 118 at equal distances from each other, and a plurality of coil units of the magnetic field generator 115 as a single layer 115a or multiple layers 115a and 115b may be disposed under the insulator 118 in a shape and at a location corresponding to the cells.

Here, the supporters 114 may be understood to be components provided between the tactile sensation providers 111 and the magnetic field generator 115 to ensure operating space for the tactile sensation providers 111. The supporters 114 may be MREs and have at least one of a curved shape and a wave shape.

The tactile sensation providers 111 according to the first embodiment have a plate shape. The supporters 114 are formed integrally with the tactile sensation providers 111 on each side of the tactile sensation providers 111 and have a curved shape. The supporters 114 are disposed between the insulator 118 and the tactile sensation providers 111 and ensure operating space for the tactile sensation providers 111 or the supporters 114.

For example, the tactile sensation providers 111 and the supporters 114 may move up and down and produce a reciprocating motion involving a change in shape in the operating space in response to a magnetic field generated by the magnetic field generator 115. The change in shape may cause the movement of one or all the cells, thereby transferring tactile sensations such as tapping to a user.

Here, the tactile sensation provider 111 may be in the shape of a plurality of laminated leaf spring rather than the plate shape. Accordingly, at least one cell may respond to the magnetic field, thereby transferring various types of tactile sensations such as vibration, beating, and tapping to the user.

Referring to FIGS. 12 and 13, in the operator 110 according to the second embodiment, a plurality of tactile sensation providers 111 and supporters 114 may define at least one cell, a plurality of cells may be disposed on the insulator 118 at equal distances from each other, and a plurality of coil units of the magnetic field generator 115 as a single layer or multiple layers may be disposed under the insulator 118 in a shape and at a location that correspond to the cells.

Here, the tactile sensation providers 111 according to the second embodiment have a plate shape. The supporters 114 are formed integrally with the tactile sensation providers 111 on each side of the tactile sensation providers 111 and have a wave shape. The supporters 114 are disposed between the insulator 118 and the tactile sensation providers 111, and ensure operating space for the tactile sensation providers 111.

For example, when a magnetic field is generated by the magnetic field generator 115, the supporters 114 made of an MRE may be transformed and one end of the tactile sensation provider 111 may tilt toward the center of the magnetic field generator 115. When no magnetic field is generated by the magnetic field generator 115, the supporters 114 may return to the original shape by their own elastic force. That is, by applying a magnetic field to one or all the cells, various types of tactile sensations such as vibration, beating, tapping, and tilting may be transferred to a user.

Referring to FIGS. 14 and 15, in the operator 110 according to the third embodiment, a plurality of tactile sensation providers 111 may define at least one cell, a plurality of cells may be disposed on the insulator 118 at equal distances from each other. Furthermore, a plurality of coil units of the magnetic field generator 115 as a single layer or multiple layers may be disposed under the insulator 118 in shapes and at locations that correspond to the cells. Here, the tactile sensation providers 111 according to the third embodiment have a tunnel shape and have internal oval spaces.

For example, when a magnetic field is generated by the magnetic field generator 115, the tactile sensation providers 111 made of an MRE may be transformed and one end of the tactile sensation provider 111 may move toward the center of the magnetic field generator 115. When no magnetic field is generated by the magnetic field generator 115, the tactile sensation providers 111 may return to the original shape by their own elastic force. That is, by applying a magnetic field to one or all the cells, various types of tactile sensations such as pinching and constriction may be transferred to a user.

Figure 16:
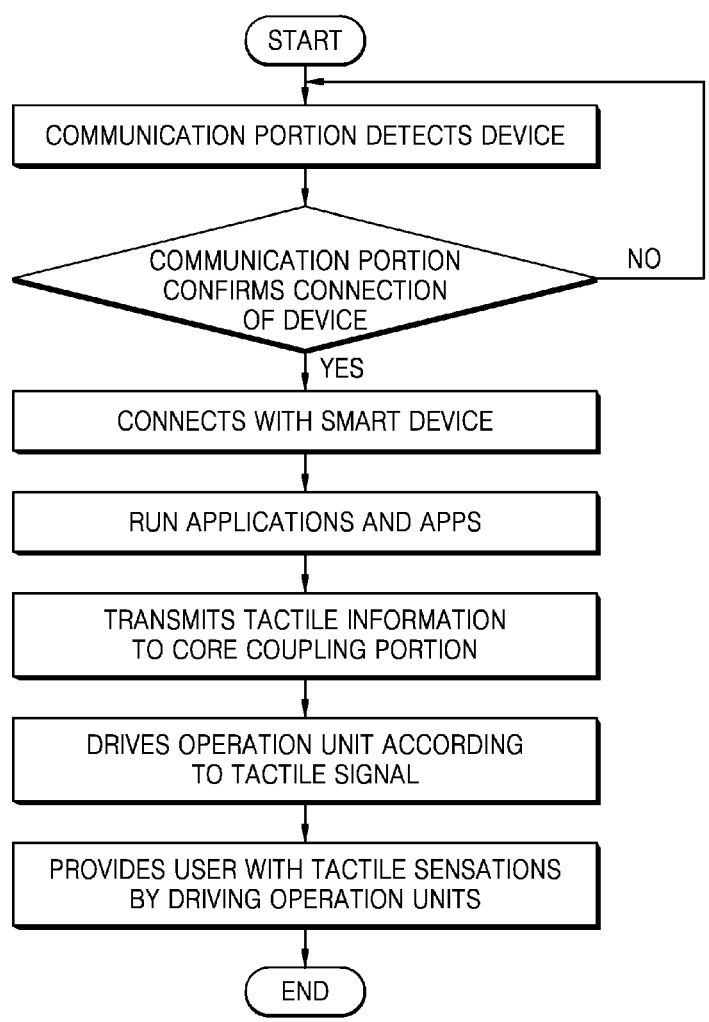
FIG. 16 illustrates an operating process of the tactile information supply device according to the third embodiment of the present invention.

Meanwhile, FIG. 16 illustrates an operating process of the tactile information supply device 100" according to the third embodiment of the present invention.

First, the core coupling portion 170 having the communication portion detects the smart core (or smart device) 300, and the communication portion and the smart core 300 are connected to each other. Here, a Bluetooth device may be used as the communication portion. If the communication portion does not detect the smart core 300, the communication portion is not connected to the smart core 300 and the above process repeats until the smart core 300 is detected.

Next, when the tactile information supply device 100" and the smart core 300 are connected to each other, the tactile information supply device 100" transmits the tactile signal transmitted by the smart core 300 to the core coupling portion 170. For example, the operating information can be converted into a tactile signal by the application or the app running in the smart core 300 and the converted tactile signal can be transmitted to the core coupling portion 170.

After the tactile signal is transmitted to the core coupling portion 170, the operation units 110k-110o of the operator 110 are driven according to the tactile signal. More particularly, the operation units 110k-110o can be driven by various methods such as pulse driving, left/right driving, and alternate driving in accordance with the tactile signal.

Accordingly, the driving of the operator 110 can provide a diversity of tactile information such as vibration, brushing, constriction, beating, pressing, tapping and tilting to the user wearing the tactile information supply device 100".

Hereinafter, various embodiments to which the tactile information supply device 100 of the present invention is applied will be described. However, the tactile information supply device 100 of the present invention is not limited to the following embodiments, and it is apparent that the tactile information supply device 100 can be applied without limitation as long as it is within the object of transmitting the notification information through tactile senses.

Figure 17:
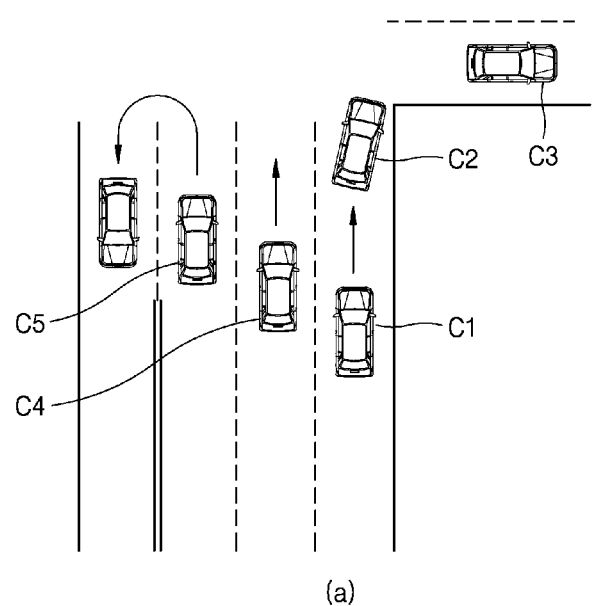
FIG. 17 illustrates an example in which a tactile information supply device according to an embodiment of the present invention is applied to a vehicle navigation system.
Figure 17:
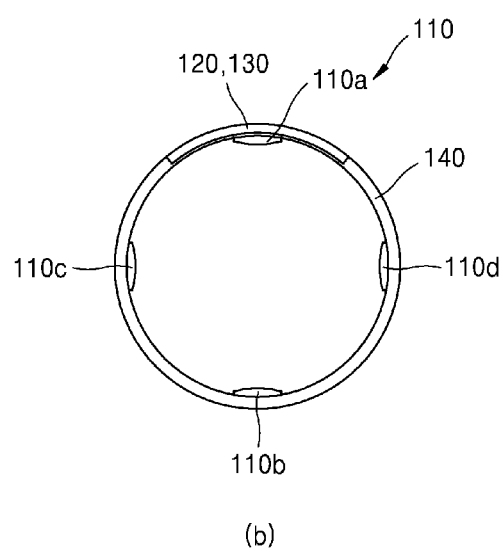

FIG. 17 illustrates an example in which a tactile information supply device 100 according to an embodiment of the present invention is applied to a vehicle navigation system. According to an embodiment of the present invention, the tactile information supply device 100 can operate in coordination with a vehicle navigation system.

Referring to (a) of FIG. 17, the tactile information supply device 100 can provide tactile information according to a direction and a distance to a destination when the vehicle is traveling on the road. A notification information transmitter of the vehicle navigation system (or the external terminal 200) transmits notification information (route guidance or location information) according to the location of the vehicle to the receiver 120 of the tactile information supply device 100.

The controller 130 can convert the notification information into tactile signals and control the operation of the operator 110, that is, each of the operation units 110a-110d. The controller 130 can control not only the operation units 110a-110d independently but also the operation intensity and operation pulses of each of the operation units 110a-110d.

Since the operation units 110a-110d can be disposed over the inner circumferential surface of the band 140, each of the operation units 110a-110d can operate corresponding to the direction information. For example, the operator 110a on the upper portion may be configured to correspond to a forward direction, the operator 110b on the lower portion to a rearward direction, the operator 110c on the left side to a left direction, and the operator 110d on the right side to a right direction.

For example, when the vehicle C1 is supposed to make a right turn after going straight for 100 meters, the vehicle navigation system can transmit the notification information "Turn right after going straight 100 meters" to the tactile information supply device 100. The controller 130 may convert the notification information into tactile signals as described below to operate the operator 110d located on the right side.

(1) The operation unit 110d transmits tactile information having a weak operation intensity (or vibration intensity) and a small operation pulse (or vibration cycle) when the vehicle has 100 m to turn right. (2) As the vehicle C2 goes straight further and gets closer to a position where the vehicle C2 is supposed to turn right, the operation unit 110d transmits tactile information of a stronger operation intensity (or vibration intensity) and a faster operation pulse (or vibration cycle). (3) When the vehicle C3 finishes the right turn, the operation unit 110d ceases to operate.

Referring further to (a) of FIG. 17, if the vehicle C4 is supposed to keep going straight through the intersection, the vehicle navigation system may transmit the notification information "Go straight" to the tactile information supply device 100. The controller 130 may convert the above notification information into a tactile signal as described below to operate the operation unit 110a located on the upper portion.

(1) The operation unit 110a transmits tactile information having a weak operation intensity (or vibration intensity) and a small operation pulse (or vibration cycle) when the vehicle has 100 m to the intersection. (2) As the vehicle C4 goes straight further and gets closer to the intersection, the operation unit 110a transmits tactile information having a stronger operation intensity (or vibration intensity) and a faster operation pulse (or vibration cycle). (3) When the vehicle C4 passes the intersection, the operation unit 110a ceases to operate.

Referring further to (a) of FIG. 17, if the vehicle C5 is supposed to make a U-turn at the intersection, the vehicle navigation system may transmit the notification information "Make a U-turn" to the tactile information supply device 100. The controller 130 may convert the above notification information into a tactile signal as described below to operate the operation units 110a-110d.

(1) The left side operation unit 110c and the right side operation unit 110d alternately transmit tactile signals having weak operation intensity (or vibration intensity) and small operation pulses (or vibration cycle) when the vehicle has 100 m to the U-turn area. (2) As the vehicle C5 goes straight further and gets closer to the U-turn area, the left side operation unit 110c and the right side operation unit 110d alternately transmit tactile signals having stronger operation intensity (or vibration intensity) and faster operation pulses (or vibration cycle). (3) When the vehicle C5 finishes the U-turn, the operation units 110c and 110d cease to operate.

Meanwhile, the operation units may operate in the order of 110d->110a->110c (i.e. counterclockwise direction) to make the U-turn guidance more intuitive.

Through the above process, the driver can receive the route/location guidance only through the tactile information transmitted by the tactile information supply device 100, without turning his/her gaze on the screen of the vehicle navigation system or listening to a voice guidance of the vehicle navigation system. Furthermore, even when the driver's attention is scattered due to a conversation with a person sitting in the passenger seat, the driver can directly receive the clear direction information through the tactile senses. Particularly, since vibrations and the like are received from the operation units 110a-110d that correspond to respective directions, there is an effect that the notification such as instructions to make a right turn, to go straight, or to make a U-turn can be received more intuitively. The tactile information supply device 100, 100', or 100" of the present invention may operate in coordination with a route guidance operation of a vehicle navigation system or a smartphone, or may operate in coordination with a route guidance function installed in the device itself, thereby providing useful route/location guidance information through tactile senses when the user drives a vehicle or walks.

Figure 18:
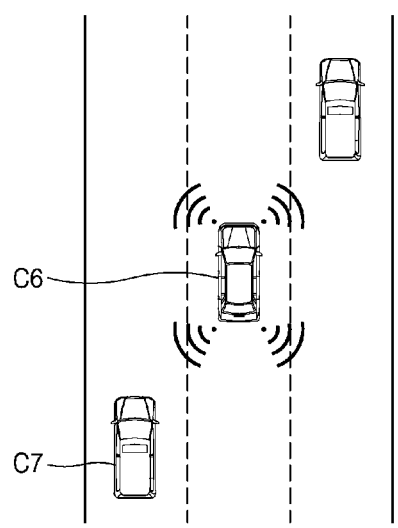
FIG. 18 illustrates an example in which a tactile information supply device according to an embodiment of the present invention is applied to a vehicle sensor.
Figure 18:
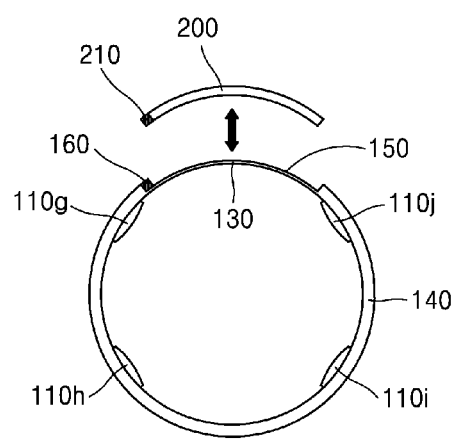

FIG. 18 illustrates an example in which a tactile information supply device 100 according to an embodiment of the present invention is applied to a vehicle sensor. According to an embodiment of the present invention, the tactile information supply device 100 may operate in coordination with a vehicle sensor.

When the driver of a vehicle C6 is about to change lanes, it is not easy for the driver to observe a vehicle C7 in a blind spot of the side view mirror, and the risk of accidents when changing lanes may increase. When the driver activates the left turn indicator to move to a left lane, a vehicle sensor may recognize that the vehicle C7 is located on the left rear side and transmit the location information (or notification information) of the vehicle C7 to the controller 130. Upon receiving the location information of the vehicle C7, the controller 130 may generate a tactile signal such that the operation unit 110h that corresponds to the position of the vehicle C7 (left rear or 7 o'clock position) with respect to the driver of the vehicle C6 can operate. The driver of the vehicle C6 can recognize that the vehicle C7 is located in a blind spot by the tactile information (or vibration) transmitted by the operation unit 110h.

Furthermore, according to an embodiment of the present invention, it is possible to monitor the surroundings of the vehicle based on the operation intensity and operation pulse of the operation units 110g-110j not only while driving but also parking.

According to an embodiment of the present invention, when lane departure due to drowsy driving or the like is detected in a vehicle that employs a lane departure detection sensor or the like, the operation units 110g-110j can operate strongly such that the driver regains attention. This may have a greater effect than when depending only on visual or auditory sense, and may have the advantage of not affecting the operation of the steering wheel since localized tactile sensations are provided.

Figure 19:
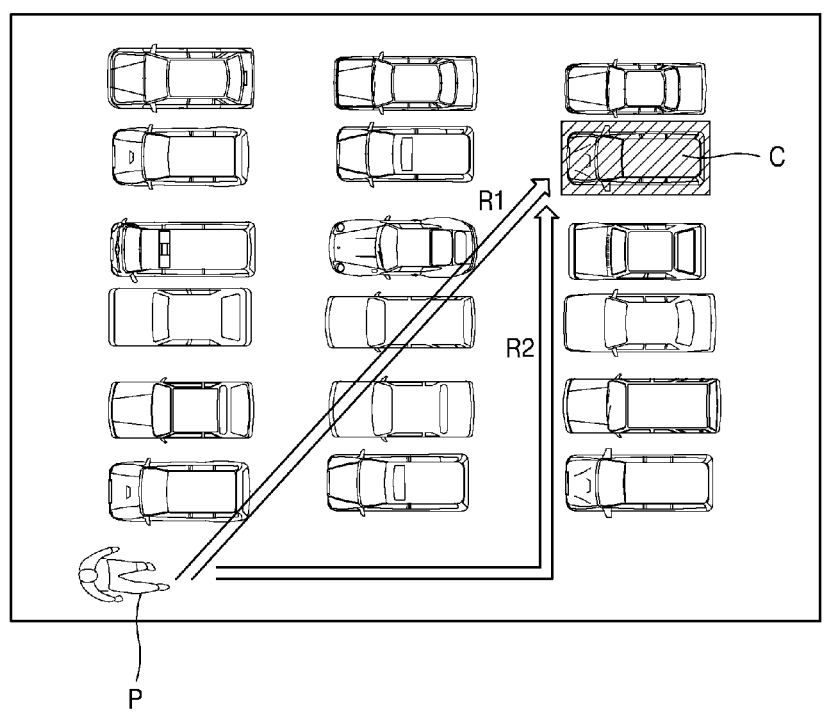
FIG. 19 illustrates an example in which a tactile information supply device according to an embodiment of the present invention is applied to providing directional guidance.

FIG. 19 illustrates an example in which a tactile information supply device according to an embodiment of the present invention is applied to providing directional guidance. According to an embodiment of the present invention, the tactile information supply device 100 may operate in coordination with an indoor/outdoor location based service (LBS).

In a complex parking lot, a function of providing route/location guidance to a parked vehicle C may be required. The tactile information supply device 110 may provide tactile information (or route guidance information) regarding the straight line R1 and the travel route R2 from the user P to the vehicle C. Here, the tactile information supply device 100, 100', or 100" may provide direction information about the route in coordination with the indoor and outdoor navigation systems installed in the devices themselves or in a separate smartphone or the like.

For example, in a multi-level car park, it is possible to first provide tactile information about whether the position of the parked vehicle is the same as the level where the user is currently located.

Then, on the straight line R1, the direction to the vehicle C can be provided by operating the operation units 110a-110j that correspond to the direction, and the distance to the vehicle C can be provided by the operation intensity and operation pulse of the corresponding operation units 110a-110j.

As shown in FIG. 17, on the travel route R2, the guidance to the vehicle C can be provided by operating the operation units 110a-110j to provide notification such as instructions to go straight, to go backward, to make a left turn, or to make a right turn.

Even though it is assumed that the location is a parking lot in FIG. 19, it goes without saying that route/location guidance to a destination in a large mall or department store can be provided in the same manner as the above-described guidance of the straight line R1 and the travel route R2.

In addition, according to one embodiment of the present invention, when a visually impaired person travels along the road, information such as instructions to go straight, to make a left turn, to make a right turn, or a crosswalk entry can be provided in cooperation with an LBS or navigation application. Here, the danger signal, warning signal, and the like can be provided as tactile information through a strong vibration or high pulse of the operation units 110a-110j.

Figure 20:
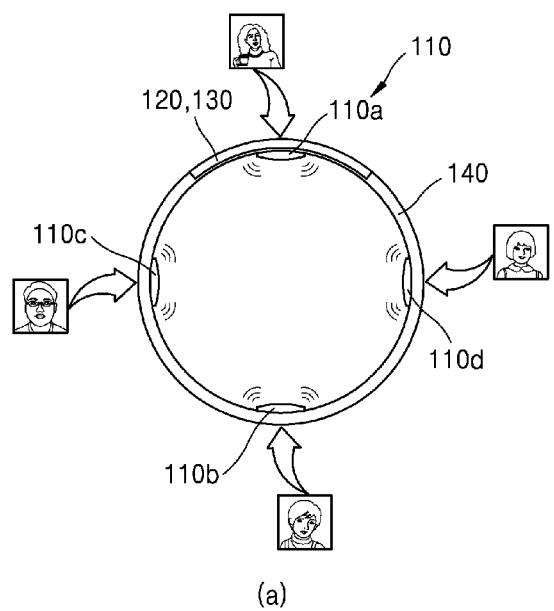
FIGS. 20 and 21 illustrate examples in which a tactile information supply device according to an embodiment of the present invention is in coordination with another terminal.
Figure 20:
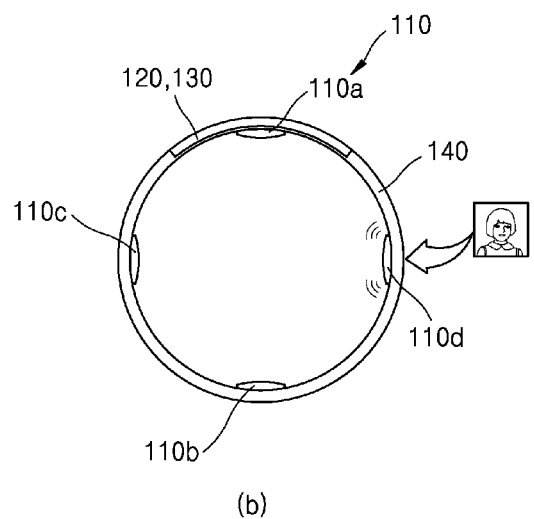
Figure 21:
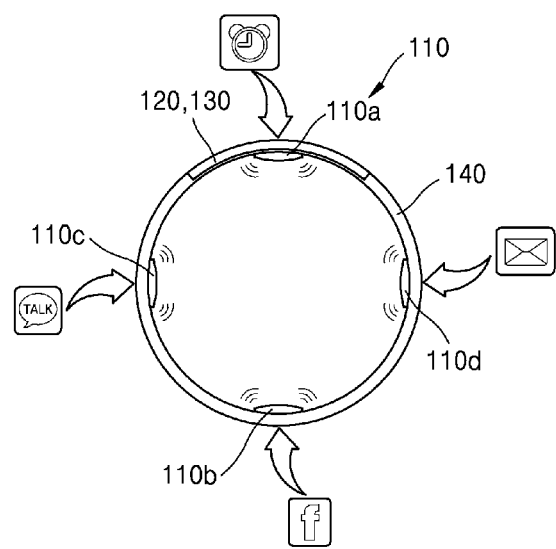

FIGS. 20 and 21 illustrate examples in which a tactile information supply device 100 according to an embodiment of the present invention is in coordination with another terminal.

Referring to FIG. 20, a terminal such as a smartphone and a tactile information supply device 100 operate in coordination with each other to provide sender information as tactile information. Here, the sender information may be understood to include a series of information about a person who has transmitted a telephone call, message, or the like to the terminal.

Referring to (a) of FIG. 20, each of the operation units 110a-110d can operate corresponding to each of the predetermined senders. For example, the operation unit 110a may correspond to the mother, the operation unit 110b to a friend, the operation unit 110c to a company boss, and the operation unit 110d to the lover. When a message or a telephone call comes from a friend, the controller 130 may operate (or vibrate) the operation unit 110b based on predetermined information. It is also possible to determine whether a call has been received or a message has been received based on the operation intensity, operation pulse or the like of the operation units 110a-110d.

Referring to (b) of FIG. 20, the operation units 110a-110d may operate only for predetermined senders. For example, if the smartphone is set in silent mode and only the communication received from the lover is set to be notified, the operation units 110a-110d may be configured such that the operation units 110a-110c do not to operate when the communication comes from the mother, a company boss, friends, etc. but the operation unit 110d operate only when the communication comes from the lover. Accordingly, it is advantageous that the terminal and the tactile information supply device 100 can be implemented for couples.

Meanwhile, by expanding the spam blocking function, the operation units 110a-110d may be configured to operate only when communication comes from phone numbers stored in the phonebook of a smartphone, and to not operate otherwise. In addition, it is possible to configure the operation units 110-110d to operate only for the important numbers and groups. As mentioned above, there is an advantage of being able to distinguish only important communications from a large number of communications. Through this, it is expected that a company will be able to smoothly proceed with meetings and help employees stay more focused at work, and that people will be able to take a rest at home without being distracted by anonymous calls.

Referring to FIG. 21, a terminal such as a smartphone and a tactile information supply device 100 may operate in coordination with each other to provide app information as tactile information. Here, the app information may be understood to include a series of information such as push notifications, calls, alarms, and the like of applications.

Each of the operation units 110a-110d can operate corresponding to each of the predetermined applications. For example, the operation unit 110a may correspond to an alarm app, the operator 110b to social network service (SNS) apps, the operator 110c to a messenger app, and the operator 110d to an email app. The controller 130 can operate (or vibrate) the operator 110c based on the predetermined information when notifications about friends added, contents uploaded, etc. come from the SNS app.

As described above, the user can obtain tactile information about the senders, apps, and the like from the positions of the operation units 110a-110d that operate. Particularly, it is not easy for the user to view the screen of the display in situations such as when the user is exercising, moving, or in a crowded public transportation vehicle. In such circumstances, however, the user can obtain information in the form of tactile senses from the tactile information supply device 100.

In addition to the above examples, the tactile information supply device 100 of the present invention may be applied to provide real-time tactile information for mobile devices, touchscreen devices, console game devices, online games etc. in the information technology (IT) field, applied to driver assistance information feedback systems such as lane departure warning systems, front crash prevention systems, and overspeed protection systems, etc. in the car industry, applied to pulsimeters, measurement of the pressure distribution in human teeth, surgical robots, etc. in the medical field, and applied to tactile Braille books in the assistive device field to transfer tactile sensations effectively.

While the present invention has been particularly shown and described with reference to embodiments thereof, it will be understood by one of ordinary skill in the art that various changes in form and details may be made therein without departing from the spirit and scope of the invention as defined by the following claims. The embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. A tactile information supply device comprising:
a receiver for receiving external notification information;
a controller for converting the notification information to a tactile signal; and
an operator for providing a user with tactile information according to the tactile signal,
wherein the operator includes a plurality of operation units and each of the operation units operates in response to different notification information to provide different tactile information to the user,
wherein the plurality of operation units provides at least one tactile information of brushing, constriction, beating, pressing, tapping and tilting,
wherein the operation unit comprises: a tactile sensation provider having a shape or position that changes in response to a magnetic field; and
a magnetic field generator for generating the magnetic field to change the shape or position of the tactile sensation provider, and
wherein the tactile sensation provider includes a magnetorheological fluid (MRF) or a magnetorheological elastomer (MRE).

2. The tactile information supply device of claim 1, further comprising:
a terminal coupling portion to which an external terminal can be coupled,
wherein, when the terminal is coupled to the terminal coupling portion, the receiver receives notification information from a notification information transmitter of the terminal.

3. The tactile information supply device of claim 2,
wherein the notification information includes app information according to an application included in the terminal, and
wherein at least one of an operation intensity and an operation pulse of each operation unit is controlled in accordance with the app information.

4. The tactile information supply device of claim 1,
wherein the operation unit comprises:
a tactile sensation provider having a shape or position that changes in response to a magnetic field; and
a magnetic field generator for generating the magnetic field to change the shape or position of the tactile sensation provider.

5. The tactile information supply device of claim 4,
wherein the tactile sensation provider maintains a first shape when not influenced by the magnetic field,
wherein the tactile sensation provider maintains a second shape when influenced by the magnetic field, and
wherein the tactile sensation provider produces a reciprocating motion between the second shape and the first shape, thereby providing tactile information.

6. The tactile information supply device of claim 5,
wherein at least one of a degree, a direction, and a frequency of the transformation from the first shape to the second shape is controlled by controlling at least one of an intensity, a direction, and a frequency of the magnetic field generated by the magnetic field generator.

7. The tactile information supply device of claim 4,
wherein the tactile sensation provider maintains a first position when not influenced by the magnetic field,
wherein the tactile sensation provider maintains a second position when influenced by the magnetic field, and
wherein the tactile sensation provider produces a reciprocating motion between the second position and the first position, thereby providing tactile information.

8. The tactile information supply device of claim 7,
wherein at least one of a degree, a direction, and a frequency of the transformation from the first position to the second position is controlled by controlling at least one of an intensity, a direction, and a frequency of the magnetic field generated by the magnetic field generator.

9. The tactile information supply device of claim 4,
wherein the tactile sensation provider includes at least one of iron (Fe), cobalt (Co) and nickel (Ni).

10. The tactile information supply device of claim 4,
wherein the tactile sensation provider includes a base portion, and a protrusion portion and a recess portion formed alternately on at least one of an upper surface and a lower surface of the base portion.

11. The tactile information supply device of claim 10,
wherein a part of a shape of the base portion is changed when influenced by the magnetic field, and the changed part of the shape of the base portion is restored to the original shape when not influenced by the magnetic field.

12. The tactile information supply device of claim 1,
wherein the plurality of operation units includes at least one of an eccentric motor, a linear resonant actuator, a piezoelectric actuator, an electroactive polymer actuator, and an electrostatic actuator.

13. The tactile information supply device of claim 1,
wherein the notification information includes route guidance information according to a location of the tactile information supply device, and
wherein at least one of an operation intensity and an operation pulse of each of the operation units is controlled according to the route guidance information.

14. The tactile information supply device of claim 13,
wherein each of the operation units operates corresponding to each direction information included in the notification information.

15. The tactile information supply device of claim 1,
wherein the notification information is received from a vehicle navigation system, and at least one of an operation intensity and an operation pulse of each of the operation units is controlled according to the notification information.

16. The tactile information supply device of claim 1,
wherein the notification information includes sender information, the sender transmitting information to the tactile information supply device, and
wherein at least one of an operation intensity and an operation pulse of each operation unit is controlled in accordance with the sender information.

17. A tactile information supply device comprising:
a core coupling portion to which a smart core for providing information can be attached or detached;
an operator connected to the core coupling portion and providing tactile information to a user;
a coupling portion provided on one side of the operator and configured to be fastened to a part of the body of the user,
wherein the operator provides at least one tactile information of brushing, constriction, beating, pressing, tapping and tilting, and
wherein the operator comprises:
a band portion in close contact with the body of the user; and
a plurality of operation units provided on the band portion, and wherein the operation unit comprises:
a tactile sensation provider having a shape or position that changes in response to a magnetic field; and
a magnetic field generator for generating the magnetic field to change the shape or position of the tactile sensation provider, and
wherein the tactile sensation provider includes a magnetorheological fluid (MRF) or a magnetorheological elastomer (MRE).

18. The tactile information supply device of claim 17,
wherein the core coupling portion converts notification information from the smart core to a tactile signal and provides the tactile signal to the operator.

19. The tactile information supply device of claim 17,
wherein the operator comprises:
a band portion in close contact with the body of the user; and
a plurality of operation units provided on the band portion.

* * * * *